United States Patent
Liu et al.

(10) Patent No.: US 11,451,137 B2
(45) Date of Patent: Sep. 20, 2022

(54) METHOD FOR PRE-CHARGING A CASCADE CONVERTER AND CASCADE CONVERTER

(71) Applicant: Delta Electronics (Shanghai) Co., Ltd., Shanghai (CN)

(72) Inventors: Rufeng Liu, Shanghai (CN); Daiping Zhou, Shanghai (CN); Kai Wang, Shanghai (CN); Yongqiang Lang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 9 days.

(21) Appl. No.: 17/239,694

(22) Filed: Apr. 26, 2021

(65) Prior Publication Data
US 2021/0336550 A1    Oct. 28, 2021

(30) Foreign Application Priority Data

Apr. 27, 2020    (CN) .......................... 202010344177.9

(51) Int. Cl.
*H02M 1/36*    (2007.01)
*H02M 1/32*    (2007.01)
*H02M 5/451*    (2006.01)

(52) U.S. Cl.
CPC ............... *H02M 1/36* (2013.01); *H02M 1/32* (2013.01); *H02M 5/451* (2013.01)

(58) Field of Classification Search
CPC ................................ H02M 1/36; H02M 1/007
See application file for complete search history.

(56) References Cited

U.S. PATENT DOCUMENTS

2014/0300298 A1* 10/2014 Liu .................. H02P 27/14
                                                    318/380
2017/0099008 A1* 4/2017 Keister .............. H02M 1/12

FOREIGN PATENT DOCUMENTS

| CN | 201774462 U | 3/2011 |
| CN | 203387411 U | 1/2014 |
| CN | 102594159 B | 6/2014 |

* cited by examiner

*Primary Examiner* — Alex Torres-Rivera
(74) *Attorney, Agent, or Firm* — CKC & Partners Co., LLC

(57) ABSTRACT

The present application provides a method for pre-charging a cascade converter and a cascade converter. The cascade converter includes a main transformer, multiple power units, a control unit and a precharge unit. Power units connected with the precharge unit are a first power unit group, and other power units are a second power unit group. The control unit controls first switch set in the precharge unit to be turned on, and low-voltage AC power supply in the precharge unit performs pre-charging for a bus capacitor through an inverter circuit in the first power unit group. When a voltage of the bus capacitor reaches a first voltage threshold, the control unit controls a rectifier circuit in the first power unit group to work to magnetize the main transformer, thereby performing pre-charging for bus capacitors in the second power unit group.

20 Claims, 8 Drawing Sheets

METHOD FOR PRE-CHARGING A CASCADE CONVERTER AND CASCADE CONVERTER

CROSS-REFERENCE TO RELATED APPLICATION

This application claims priority to Chinese Patent Application No. 202010344177.9, filed on Apr. 27, 2020, the disclosure of which is hereby incorporated by reference in its entirety.

TECHNICAL FIELD

The present application relates to the field of control technology, and in particular to a method for pre-charging a cascade converter and a cascade converter.

BACKGROUND

With the rapid development of industrial production, the application of cascade converters is becoming more and more extensive. For example, in devices such as mine elevators, down belt conveyors, due to presence of different forms of energy conversion, motors are in a power regeneration state. For energy saving considerations, the regenerative energy of the motors is generally fed back to a power grid, thus the cascade converter is required to realize energy feedback. Wherein, each power unit of this converter includes a rectifier unit, an inverter unit and a bus capacitor connecting the both. Due to the presence of the bus capacitor, when the converter starts to work, a voltage across the bus capacitor suddenly changes, resulting in a large inrush current, which will cause an extreme impact on power semiconductor devices in the rectifier unit, and even damage the devices.

In order to reduce or avoid the inrush current impact on the power semiconductor devices, in the prior art, the problem is usually solved by means of performing pre-charging for the bus capacitor. In a method, pre-charging for a primary winding of the transformer is performed, for example, a pre-charging module is connected to the primary winding of the transformer through a high-voltage switch, and pre-charging for the bus capacitor is implemented through the transformer. Wherein, the high-voltage switch may be a high-voltage circuit breaker or a contactor. Another method is that to perform pre-charging for the bus capacitor through a secondary winding of the transformer. For example, an auxiliary winding is provided on the secondary of the transformer, and a low-voltage power supply performs pre-charging for the bus capacitor of the power unit through an additional inverter circuit and the auxiliary winding. In addition, there are also ways to realize pre-charging for the bus capacitor through a cooperation of multiple groups of high-voltage switches.

For the above solutions, one is that high-voltage high-power devices are used at a high-voltage side, the cost is high, and the requirements for the fixing and insulation design and the like of pre-charging apparatus are relative high; another is that the pre-charging apparatus includes many devices that should be additionally prepared. It can be seen that, no matter which of the above-mentioned solutions, it brings greater challenges to the cost investment and realizability of the pre-charging solution.

SUMMARY

The present application provides a method for pre-charging a cascade converter and a cascade converter, to solve the technical problem that the pre-charging solution of the cascade converter in the prior art has an excessively high investment cost and difficult realization.

In a first aspect, the present application provides a cascade converter. The cascade includes: a main transformer, multiple power units, a precharge unit, and a control unit. The main transformer includes a primary winding and multiple secondary windings. The multiple power units are connected with the multiple secondary windings in a one-to-one correspondence. Each of the power units includes a rectifier circuit, a bus capacitor, and an inverter circuit, and the bus capacitor is connected between the rectifier circuit and the inverter circuit. The precharge unit is connected with at least one power unit; where the precharge unit includes a low-voltage AC power supply and a first switch set, and the low-voltage AC power supply is configured to provide power to pre-charge the converter; where the at least one power unit connected with the precharge unit is a first power unit group, and power units not connected with the precharge unit are a second power unit group. The control unit is configured to control the first switch set to be turned on, so that the low-voltage AC power supply performs pre-charging for a corresponding bus capacitor through the inverter circuit in the first power unit group, and control the rectifier circuit in the first power unit group to work to magnetize the main transformer when a voltage of the bus capacitor in the first power unit group reaches a first voltage threshold, thereby performing pre-charging for bus capacitors in the second power unit group.

In a second aspect, the present application provides a method for pre-charging a cascade converter. The converter includes a main transformer, multiple power units, a precharge unit and a control unit; each of the power units includes a rectifier circuit, a bus capacitor, and an inverter circuit, and the bus capacitor is connected between the rectifier circuit and the inverter circuit. The precharge unit is connected with at least one power unit, and the precharge unit includes a low-voltage AC power supply and a first switch set; where the at least one power unit connected with the precharge unit is a first power unit group, and power units not connected with the precharge unit are a second power unit group. The method includes: turning on the first switch set, so that the low-voltage AC power supply performs pre-charging for a corresponding bus capacitor through an inverter circuit in the first power unit group; and controlling a rectifier circuit in the first power unit group to work to magnetize the main transformer when a voltage of the bus capacitor in the first power unit group reaches a first voltage threshold, thereby performing pre-charging for bus capacitors in the second power unit group.

DESCRIPTION OF DRAWINGS

In order to more clearly illustrate the technical solutions in the embodiments of the present application or in the prior art, the drawings needed to be used in the description of the embodiments or the prior art will be briefly described below. Obviously, the drawings in the following description are some embodiments of the present application, for those skilled in the art, other drawings can be obtained according to these drawings without any creative efforts.

DESCRIPTION OF EMBODIMENTS

Figure 1:
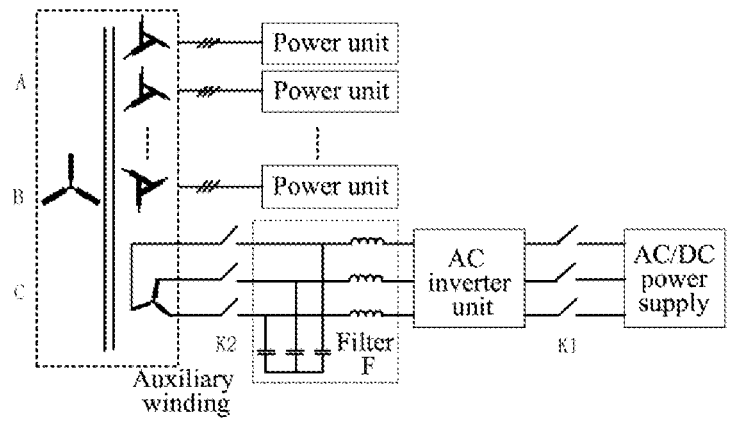
FIG. 1 is a schematic structural diagram of a cascade converter in the prior art.

Exemplary embodiments will be described in detail here, examples of which are shown in the drawings. When the following description refers to the drawings, unless otherwise indicated, the same numerals in different drawings represent the same or similar elements. Implementations described in the following exemplary embodiments do not represent all embodiments consistent with the present application. In contrast, they are merely examples of methods and apparatuses consistent with some aspects of the present application as described in detail in the appended claims.

The terms "first", "second", "third", "fourth", and the like (if present) in the description and claims and the above-mentioned drawings of the present application are used to distinguish similar objects, and are not necessarily used to describe a specific order or a before and after sequence. It should be understood that data used in this way may be interchanged when appropriate, so that the embodiments of the present application described herein can be implemented in an order except for those illustrated or described herein, for example. Furthermore, the terms "including" and "having" and any of their variations are intended to cover non-exclusive inclusions, for example, processes, methods, systems, products, or devices that include a series of steps or units are not necessary to be limited to those steps or units that explicitly listed, instead may include other steps or units that are not explicitly listed or inherent to these processes, methods, products or devices.

Each power unit of a cascade converter includes a rectifier unit, an inverter unit, and a bus capacitor connected between the rectifier unit and inverter unit. Due to the existence of the bus capacitor, when a high-voltage side of the converter is powered, a voltage across the bus capacitor suddenly changes, resulting in a large inrush current, which will cause an extreme impact on power semiconductor devices of rectifier unit, and may cause performance damage of the rectifier unit. Based on this phenomenon, in order to avoid or reduce the current impact caused by the startup of the high-voltage side of the converter, a solution of pre-charge on the bus capacitor is usually adopted to overcome this problem.

In the prior art, the existing pre-charging solutions include three methods according to the position of pre-charging apparatus in the cascade converter.

A first method is to perform pre-charging for a primary winding of the transformer of the cascade converter. Specifically, a pre-charging module is connected in series between the primary winding of the transformer and a power grid, and the pre-charging module is composed of a charging resistor and a high-voltage switch connected in parallel. When the high-voltage side of the transformer is powered on, bus capacitors are pre-charged through a charging resistor and the transformer. After pre-charging is completed, the high-voltage switch is turned on to bypass the charging resistor, thereby completing the pre-charging process of the bus capacitor of the power units. In this solution, the pre-charging module needs to use high-power devices with high-voltage nature. In actual working conditions, the fixing of the pre-charging module needs to meet the requirements of the insulation design, which not only increases the physical volume of the pre-charging module and the investment cost, but also brings greater challenges to realizability.

A second method is to perform pre-charging for secondary windings of the transformer as shown in FIG. 1. FIG. 1 is a schematic structural diagram of pre-charging of a cascade converter in the prior art. The solution is to pre-charge the bus capacitors through an auxiliary winding of the transformer. As shown in FIG. 1, the pre-charging module includes an AC power supply or DC power supply, a first contactor K1, an AC inverter unit, a filter, a second contactor K2, and the auxiliary winding. The pre-charging module magnetize the transformer through the auxiliary winding, thereby achieving the pre-charging for the bus capacitors in the power units. In this method, the additional auxiliary winding and the AC inverter unit need to be added, and related control and sampling circuits and the like are also needed, thus increasing the cost as well.

Figure 2:
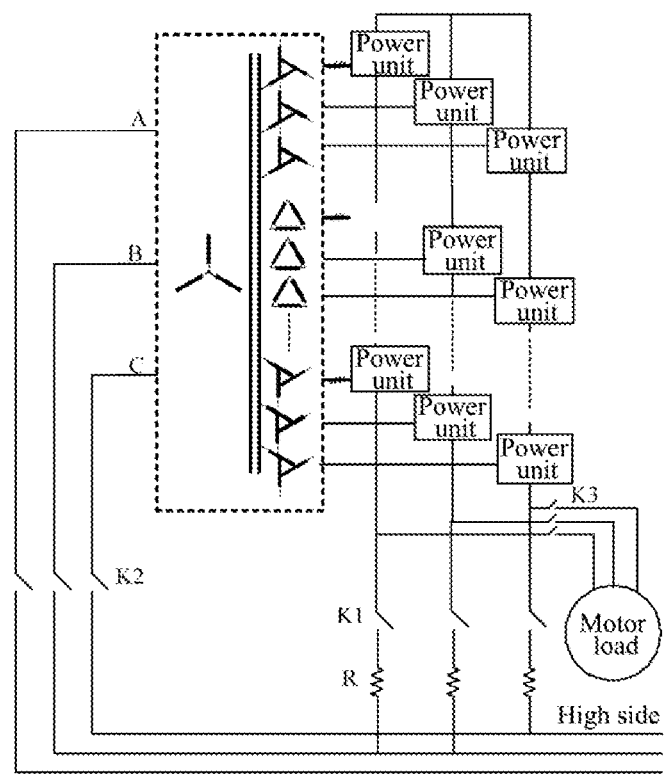
FIG. 2 is a schematic structural diagram of another cascade converter in the prior art.

A third method is to perform pre-charging for secondary windings of the transformer as shown in FIG. 2, and FIG. 2 is a schematic structural diagram of another cascade converter in the prior art. The method is to achieve pre-charging through a cooperation among the three groups of high-voltage switches. As shown in FIG. 2, a first group of high-voltage switches K1 are connected with charging resistors R, a second group of high-voltage switches K2 are connected with primary winding, and a third group of high-voltage switches K3 are connected with a motor. The first group of high-voltage switches K1 are switched on, then the charging resistors R and the inverter circuits in the connected power unit perform pre-charging for the corresponding bus capacitors. When pre-charging is completed, the first group of high-voltage switches K1 are turned off and the second group of high-voltage switches K2 and the third group of high-voltage switches K3 are turned on. In this method, two additional groups of high-voltage switches are needed. The method needs to choose high-voltage high-power charging resistors R and high-voltage high-power switches, thus there are similar defects as the first category of solution.

The existing pre-charging solutions have technical problems of high investment cost and great challenges of realizability. For the technical problems, the embodiments of the present application provide a method for pre-charging a cascade converter and a cascade converter. The method for pre-charging the cascade converter provided by the embodiment of the present application can realize pre-charging for the cascade converter. Where, a precharge unit is connected with at least one power unit, and the precharge unit includes a low-voltage AC power supply and a first switch set. When the first switch set is turned on, the low-voltage AC power supply can perform pre-charging for bus capacitor in the power unit connected with the precharge unit. When voltage of the bus capacitor reaches a first voltage threshold, magnetizing the main transformer is magnetized by controlling corresponding rectifier circuits to work, so as to perform pre-charging for corresponding bus capacitors in the power units not connected with the precharge unit, so the bus capacitors of all power units in the cascade converter can be pre-charged. Compared with the prior art, there is no need to set additional circuits such as pre-charging converters and the like, and controllable soft charging for the capacitor of each unit is achieved by using own conversion circuit of the cascade converter, which effectively avoids inrush current impact on the power semiconductor devices when the high-voltage side is powered on, improves the startup reliability of the system and greatly reduces the investment cost of the pre-charging method.

Exemplary application scenarios of the embodiments of the present application are introduced in the following.

Figure 3:
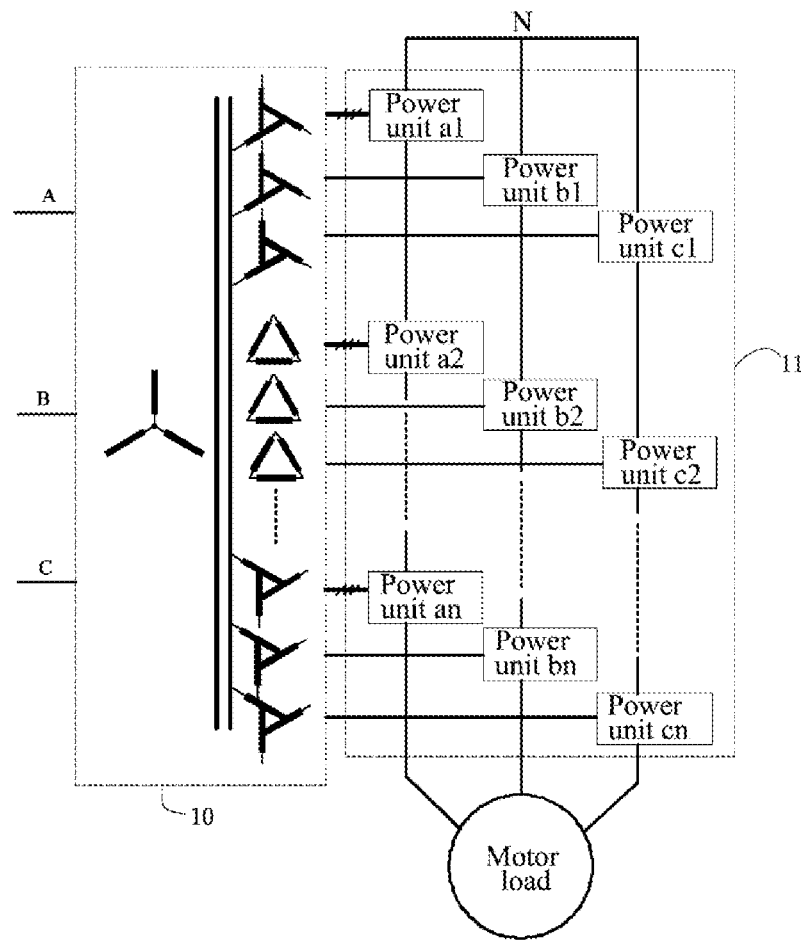
FIG. 3 is a schematic diagram of a topology structure of a cascade converter provided by an embodiment of the present application.

FIG. 3 is a schematic diagram of a topology structure of a cascade converter provided by an embodiment of the present application. Where, the method for pre-charging a cascade converter provided by the embodiments of the present application is applicable to converters with a topology structure having the following characteristics. As shown in FIG. 3, the cascade converter includes a main transformer 10 and multiple power units. The main transformer 10 includes a primary winding and multiple secondary windings. The multiple power units and the multiple secondary windings are connected in a one-to-one correspondence. Where, the primary winding can be a three-phase winding (A-phase, B-phase, C-phase), the secondary windings may be a three-phase winding (as shown in FIG. 3), and may also be a single-phase winding. In the embodiment shown in FIG. 3, the cascade converter has three-phase power unit groups, and the power unit group of each phase has n power units, for example, the power unit group of A-phase includes power units a1~an, and the power unit group of B-phase includes power units b1~bn, the power unit group of C-phase includes power units c1~cn. Terminals of the power units with the same phase are cascaded in sequence, two output terminals of each phase are formed, and output terminals of three-phases can be connected in a Y shape. For example, one output terminal of each phase is connected to a neutral point N, and the other output terminal is connected to a load, such as a motor.

Figure 4:
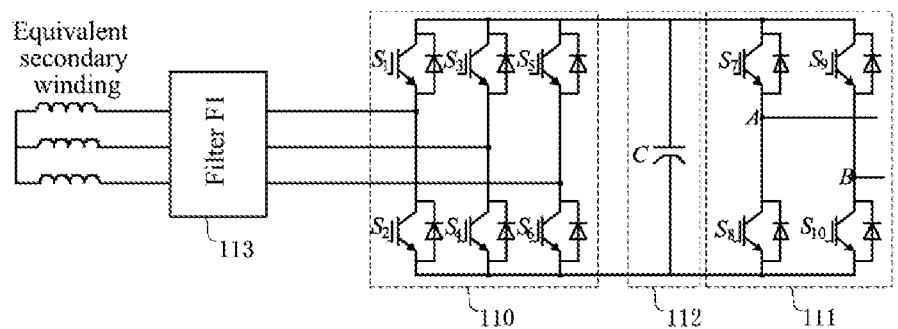
FIG. 4 is a schematic structural diagram of a power unit provided by an embodiment of the present application.

Further, FIG. 4 is a schematic diagram of a topology structure of a power unit in a cascade converter provided by an embodiment of the present application. As shown in FIG. 4, each power unit includes a rectifier circuit 110 (a rectifier/feedback unit or Active Front End, hereinafter referred to as AFE), an inverter circuit 111, and a bus capacitor 112 connected between the rectifier circuit 110 and the inverter circuit 111. Where, the rectifier circuit 110 and the inverter circuit 111 both have a characteristic of dual energy flow. In some embodiments, the converter may also be, for example, an H-bridge topology converter, a three-level topology (Neutral Point Clamped, hereinafter referred as NPC) converter and the like, and the embodiments of the present application include but are not limited to this. The method for pre-charging the cascade converter provided by the embodiments of the present application can perform pre-charging for the bus capacitors of the power units of the cascade converter, to avoid inrush current impact on the semiconductor devices in the power units caused by the startup of the converter. In addition, FIG. 4 is a schematic structural diagram of each power unit when the secondary of the main transformer is a three-phase winding in FIG. 3. Where, S1 to S6 are semiconductor devices in the rectifier circuit 110, S7 to S10 are semiconductor devices in the inverter circuit 111, and capacitor C is the bus capacitor 112. In some embodiments, the semiconductor devices may be, for example, a metal-oxide semiconductor field effect transistor (MOSFET), an insulated gate bipolar transistor (IGBT) integrated and encapsulated with an anti-parallel diode and the like.

Figure 5:
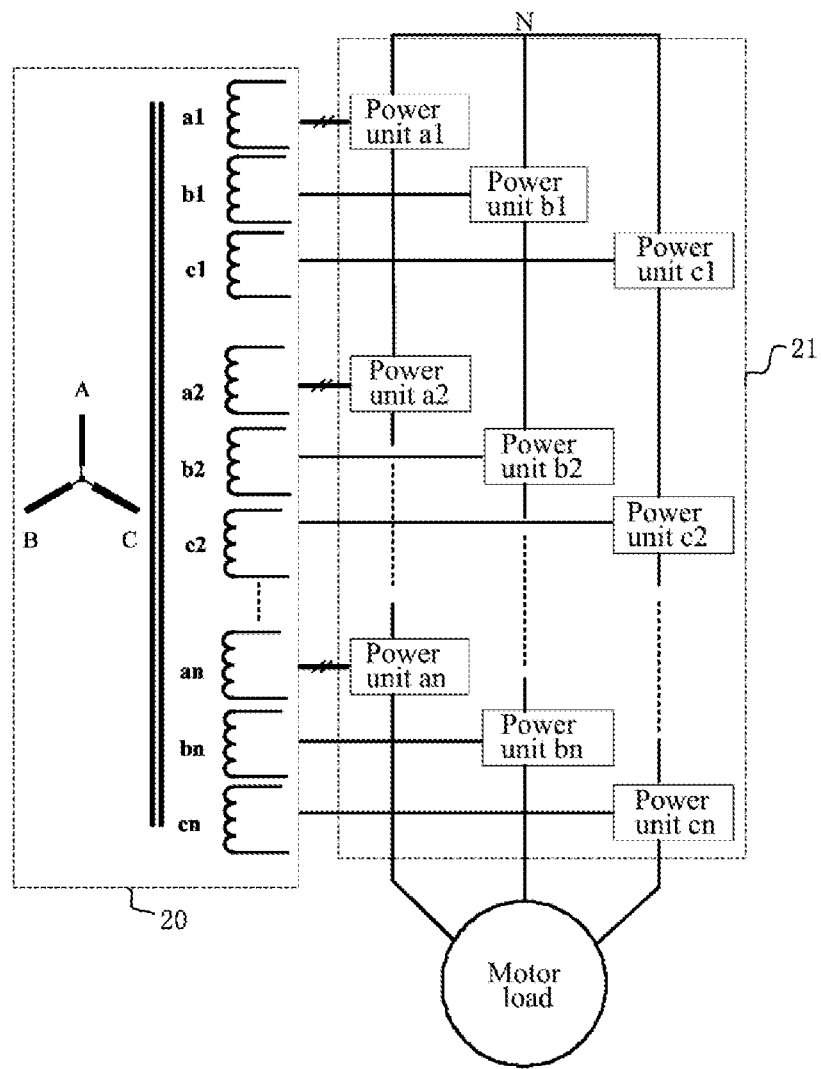
FIG. 5 is a schematic diagram of a topology structure of another cascade converter provided by an embodiment of the present application.
Figure 6:
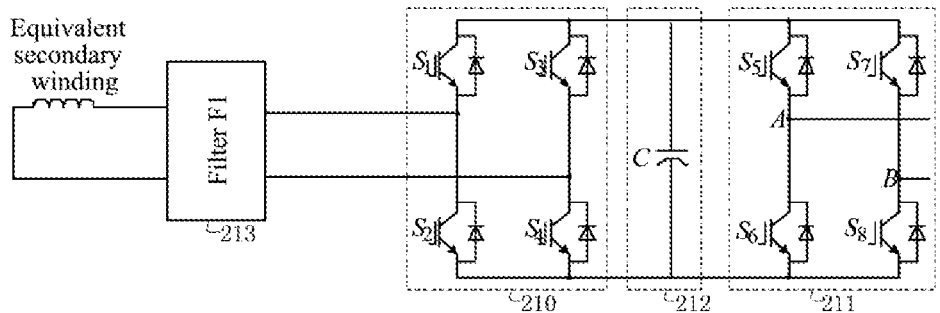
FIG. 6 is a schematic structural diagram of another power unit provided by an embodiment of the present application.

FIG. 5 is a schematic diagram of a topology structure of another cascade converter provided by an embodiment of the present application, in which the secondarys of the main transformer 20 are single-phase windings. The secondary winding of the cascade converter provided by the embodiments of the present application can be single-phase windings or three-phase windings. As shown in FIG. 5, the primary winding is a three-phase winding (A-phase, B-phase, and C-phase), and the secondary windings may be single-phase windings, and each single-phase winding is connected with a corresponding power unit. Similar to the embodiment shown in FIG. 3, in the embodiment shown in FIG. 5, the cascade converter has three-phase power unit groups, and each power unit group has n power units (for example, the power unit group of A-phase includes power units a1~an, the power unit group of B-phase includes power units b1~bn, the power unit group of C-phase includes power units c1~cn), and terminals of the power units with the same phase are cascaded in sequence, two output terminals of each phase are formed, and the output terminals of three-phases can be connected in a Y shape. For example, one output terminal of each phase is connected to a neutral point N, and the other output terminal is connected to a load, such as a motor. Further, FIG. 6 is a schematic diagram of a topology structure of another power unit in a cascade converter provided by an embodiment of the present application. As shown in FIG. 6, each power unit includes a rectifier circuit 210, an inverter circuit 211, and a bus capacitor 212 connecting the both. Similarly, in FIG. 6, S1 to S4 are semiconductor devices in the rectifier circuit 210, S5 to S8 are semiconductor devices in the inverter circuit 211, and capacitor C is the bus capacitor 212. Where, the rectifier circuit 110 and the inverter circuit 111 both have a characteristic of dual energy flow. And the topologies of the rectifier circuit 110 and the inverter circuit 111 are not limited to this.

In the above-described embodiments, the main transformer 10 in FIG. 3 and the main transformer 20 in FIG. 5 may be phase-shifted transformers or non-phase-shifted transformers, and the embodiments of the present application are not limited thereto. A filter 113 in each power unit shown in FIG. 4 and a filter 213 in each power unit shown in FIG. 6 may be L filters or LC filters, or no filter may be provided. The embodiments of the present application are not limited thereto.

Where, FIG. 4 and FIG. 6 show schematic structural diagrams of one power unit in FIG. 3 and FIG. 5, respectively, and the cascade converter of FIG. 3 and FIG. 5 may include multiple power units. In addition, the number of the multiple power units varies with different voltage levels. FIG. 3 and FIG. 5 of the present application are only exemplary illustrations. The specific number of the power units can be set according to actual working conditions and the embodiments of the present application do not limit thereto.

The technical solutions of the present application and how the technical solutions of the present application solve the above technical problems will be described in detail below with specific embodiments. The following specific embodiments may be combined with each other, and the same or similar concepts or processes may not be repeated in some embodiments. The embodiments of the present application will be described below in combination with the drawings.

Figure 7:
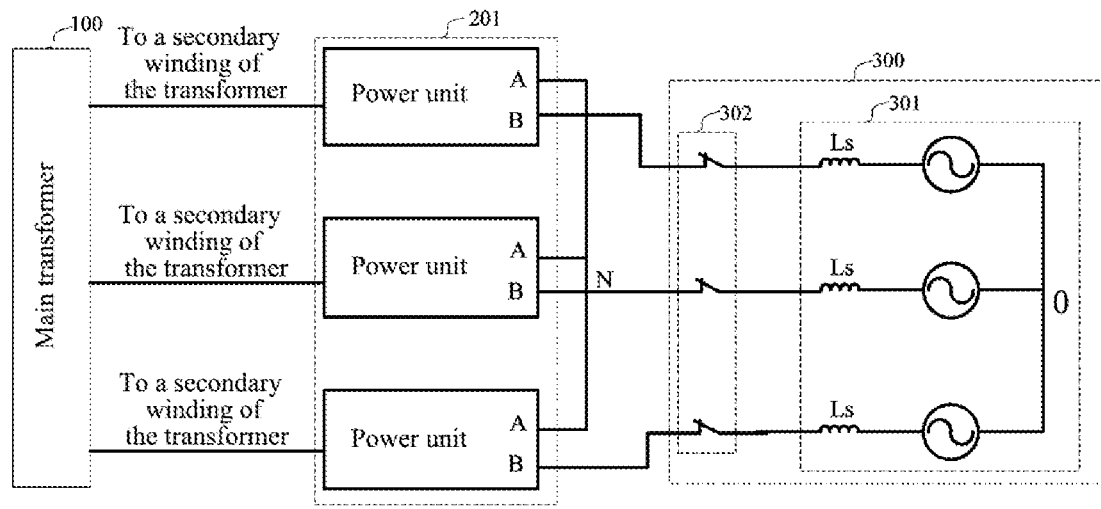
FIG. 7 is a schematic diagram of pre-charging structural of a cascade converter provided by a first embodiment of the present application.

In this embodiment, a precharge unit is connected with at least one power unit. FIG. 7 is a schematic diagram of pre-charging structural of a cascade converter provided by a first embodiment of the present application. As shown in FIG. 7, the precharge unit 300 connected with three power units is shown as an example. Further, the precharge unit 300 includes a low-voltage AC power supply 301 and a first switches set 302. The low-voltage AC power supply 301 is used to provide power to precharge the converter. Where, the power units connected with the precharge unit 300 are a first power unit group 201, and the power units not connected with the precharge unit 300 are a second power unit group. In some embodiments, first power unit group connected with the precharge unit 300 may be the power units a1, b1, c1, or may be the power units a2, b2, c2, or even the power units an, bn, cn, in FIG. 3 or FIG. 5, which are not limited in the embodiments of the present application. In some embodiments, the cascade converter further includes a control unit which controls the first switch set 302 to be turned on, so that the low-voltage AC power supply 301 perform pre-charging for corresponding bus capacitors through inverter circuits in the first power unit group 201, and after voltages of the bus capacitors reach a first voltage threshold, rectifier circuits in the first power unit group 201 are controlled to work, to magnetize the main transformer 100, thereby performing pre-charging for the bus capacitors in the second power unit group. In other embodiments, the control unit can also control the first switch set 302 to be turned on, so that the low-voltage AC power supply 301 perform pre-charging for the corresponding bus capacitors through the inverter circuits in the first power unit group 201, and after a second preset duration, the rectifier circuits in the first power unit group 201 are controlled to work, to magnetize the main transformer 100, thereby performing pre-charging for the bus capacitors in the second power unit group.

Figure 8:
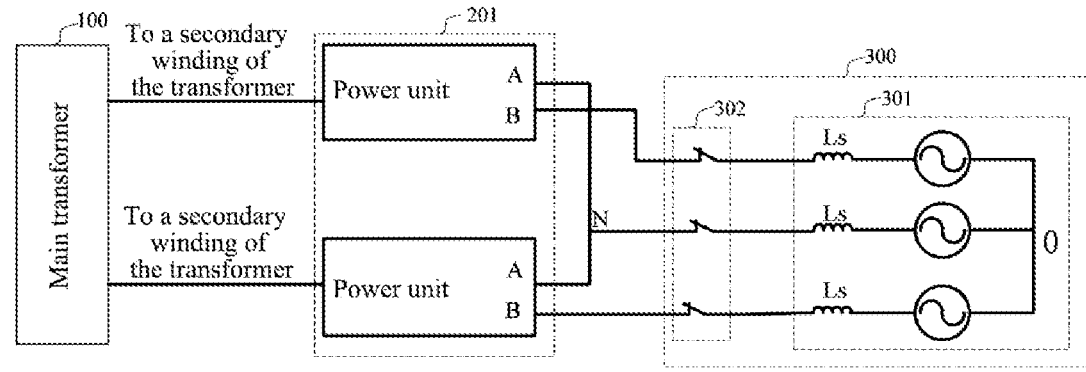
FIG. 8 is a schematic diagram of pre-charging structural of a cascade converter provided by a second embodiment of the present application.
Figure 9:
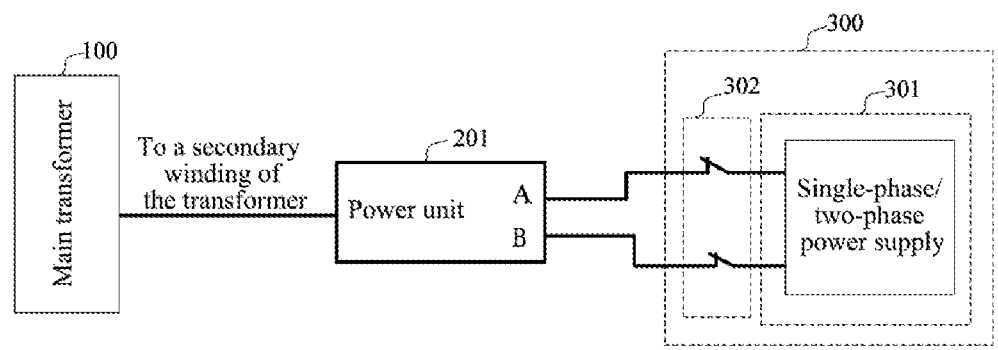
FIG. 9 is a schematic diagram of pre-charging structural of a cascade converter provided by a third embodiment of the present application.

In the embodiment shown in FIG. 7, the number of power units in the first power unit group 201 is three. The low-voltage AC power supply 301 is a three-phase power supply. In other embodiments, when the number of power units in the first power unit group 201 may also be two and one, respectively, and the schematic diagrams of pre-charging structural of cascade converters provided by the embodiments of the present application are shown in FIG. 8 and FIG. 9 respectively. FIG. 8 is schematic diagram of pre-charging structural of a cascade converter provided by a second embodiment of the present application, where the first power unit group 201 may include, for example, the power units a1, b1 in FIG. 3 or FIG. 5, which is not limited in the embodiments of the present application. FIG. 9 is schematic diagram of pre-charging structural of a cascade converter provided by a third embodiment of the present application, where the first power unit group 201 may be, for example, any one of the power units in FIG. 3 or FIG. 5, for example, may be the power unit a1 or b1 or c1. Where, when the first power unit group 201 may include only one power unit, the low-voltage AC power supply 301 may be a single-phase or two-phase power supply, as shown in FIG. 9.

In some embodiments, the first power unit group 201 are located at a location nearby a neutral point. The precharge unit 300 may preferentially connect with the power units connected with the neutral point. The precharge unit 300 firstly performs pre-charging for the bus capacitors of these power units in the first power unit group 201, and after a second preset duration or after the voltages of the bus capacitors reach the first voltage threshold, the rectifier circuits in the first power unit group 201 are controlled to work, to magnetize the main transformer 100, thereby performing pre-charging for other bus capacitors in the second power unit group.

The pre-charging process is illustrated in detail in the following by taking that the number of power units in the first power unit group 201 shown in FIG. 7 is three as an example. The three power units connected with the precharge unit 300 are referred as the first power unit group 201, and other power units not connected with the precharge unit 300 are referred as the second power unit group. The structure or connection manner of the main transformer 100, the power units and the like, may be referred to FIGS. 3-6, which will not be repeated herein. In addition, the primary winding of the main transformer 100 does not participate in the pre-charging process, and which is not shown in FIG. 7 to FIG. 9. As shown in FIG. 7, the precharge unit 300 includes low-voltage AC power supply 301 and first switch set 302. The low-voltage AC power supply 301 can provide power to precharge the cascade converter, which can be 380V or 220V. The first switch set 302 may include multiple switches or contactors. The first switch set 302 is connected between the first power unit group 201 and the low-voltage AC power supply 301. For example, output copper bars or terminals of the three power units in the first power unit group 201 are connected with the low-voltage AC power supply 301 through the first switch set 302.

The control unit is configured to control the pre-charging process of the converter, for example, to control the first switch set 302 to be turned on before the cascade converter starts up. When the first switch set 302 are turned on, the low-voltage AC power supply 301 perform pre-charging for the corresponding bus capacitors through the inverter circuits in the first power unit group 201. Taking the power unit in FIG. 6 as an example, through the anti-parallel diodes of the semiconductor devices in the inverter circuit 211, the low-voltage AC power supply 301 performs pre-charging for the bus capacitor 212. When the voltage of the bus capacitor of each power unit in the first power unit group 201 reaches the first voltage threshold, the control unit starts to control the corresponding rectifier circuit in the first power unit group 201 to work to magnetize the main transformer 100, to further implement pre-charging for the bus capacitor of each power unit in the second power unit group (the power units not connected with the precharge unit 300). The first voltage threshold can be set according to the actual working conditions of the cascade converter, which is not limited in the embodiments of the present application. Where, the control unit can be understood as a control apparatus for performing pre-charging in the cascade converter, which is not shown in FIG. 7 to FIG. 9. In other embodiments, through the anti-parallel diodes of the semiconductor devices in the inverter circuit 211, the low-voltage AC power supply 301 performs pre-charging for the bus capacitor 212, and after the second preset duration, the control unit starts to control the corresponding rectifier circuit 210 in the first power unit group 201 to work to magnetize the main transformer 100, to further implement pre-charging for the bus capacitor of each power unit in the second power unit group. Similarly, the second preset duration may be set according to the actual working conditions of the cascade converter, which is not limited in the embodiments of the present application.

In an embodiment, the power units connected with the precharge unit 300, that is, the first power unit group 201 are located at a location nearby the neutral point, for example, the first power unit group 201 include the power units a1, b1, c1 in FIG. 3 or FIG. 5, the point N shown in FIG. 7 to FIG. 9 is shown as the point N in FIG. 3 or FIG. 5.

The pre-charging method of the cascade converter provided by this embodiment, by controlling the first switch set to be turned on, the low-voltage AC power supply perform pre-charging for corresponding bus capacitors through the inverter circuits in the first power unit group. After the second preset duration or when the voltage of the bus capacitors in the first power unit group reaches the first voltage threshold, the control unit controls the rectifier circuits in the first power unit group to work, to magnetize the main transformer, thereby performing pre-charging for the bus capacitors in the second power unit group, to further perform the entire pre-charging process of the cascade converter. There is no need to set additional circuits such as pre-charging power devices or converters and the like, and the present disclosure uses own cascade converter to achieve controllable soft charging for the capacitor of each unit, which effectively avoids inrush current impact on the power semiconductor devices when the high-voltage side is powered on, and improves the startup reliability of the system, and greatly reduces the investment cost of the pre-charge.

Figure 10:
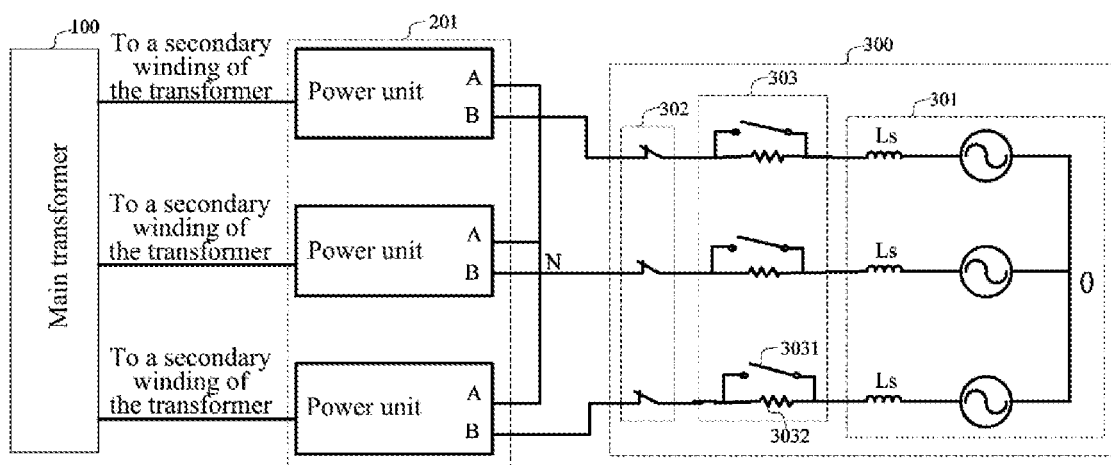
FIG. 10 is a schematic diagram of pre-charging structural of a cascade converter provided by a fourth embodiment of the present application.

Based on the embodiments shown in FIG. 7 to FIG. 9, FIG. 10 is schematic structural diagram of pre-charging of a cascade converter provided by a fourth embodiment of the present application. As shown in FIG. 10, the precharge unit 300 in the cascade converter provided by the embodiment of the present application further includes: current limit start circuit set 303.

Where, the current limit start circuit set 303 are connected between the low-voltage AC power supply 301 and the first switch set 302, and include at least one second switch 3031 and at least one current limit device 3032 connected in parallel. As shown in FIG. 10, the current limit start circuit set 303 includes three second switches 3031 and three current limit devices 3032. The second switch 3031 may be relay or electronic switch, and the current limit device 3032 may be reactor and/or resistor, and values thereof may be set according to actual working conditions, which is not limited in the embodiments of the present application. The second switch 3031 can bypass the current limit device 3032 when turned on. Thus, the current limit start circuit set 303 can limit current when starting pre-charging.

For example, when starting pre-charging, the control unit controls the first switch set 302 to be turned on, and the second switch 3031 to be turned off. The low-voltage AC power supply 301 perform pre-charging for the corresponding bus capacitors through the current limit devices 3032 and the inverter circuits in the first power unit group 201. The control unit controls the second switch 3031 to be on when the voltage of the corresponding bus capacitors in the first power unit group 201 reaches a current limit voltage threshold or after a first preset duration (for example, may be a power frequency period). At this time, the second switch 3031 is turned on to bypass the current limit device 3032, so that the low-voltage AC power supply 301 further pre-charge the bus capacitors in the first power unit group 201, and the voltages of the bus capacitors further increases. It can be seen that the presence of the current limit start circuit set 303 makes the pre-charging process of the bus capacitors of the first power unit group to be controllable, and current of pre-charging won't be too large. Where, the current limit voltage threshold of the bus voltage can be set according to actual working conditions, which is not limited in the embodiments of the present application.

Figure 11:
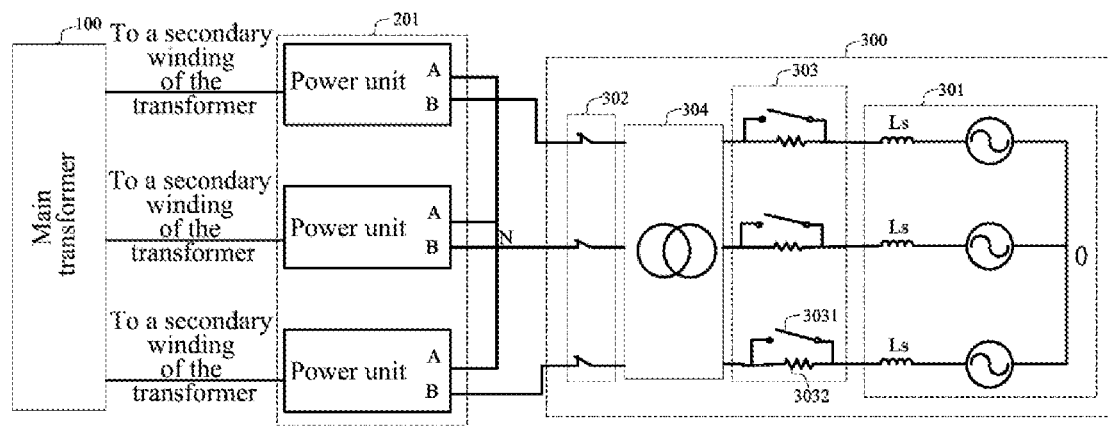
FIG. 11 is a schematic diagram of pre-charging structural of a cascade converter provided by a fifth embodiment of the present application.

In some embodiments, the precharge unit further includes an auxiliary transformer. FIG. 11 is schematic structural diagram of pre-charging of a cascade converter provided by a fifth embodiment of the present application. As shown in FIG. 11, the precharge unit 300 of the cascade converter further includes: an auxiliary transformer 304.

Where, the auxiliary transformer 304 is connected between the current limit start circuit set 303 and the first switch set 302, and the auxiliary transformer 304 is configured to transform the voltage provided by the low-voltage AC power supply 301, so that the voltage of the low-voltage AC power supply 301 can be increased, thereby further increasing the voltage of the bus capacitors.

In some embodiments, the precharge unit provided by the embodiment of the present application may further include an auxiliary transformer 304 while not including current limit start circuit set 303. At this time, the auxiliary transformer 304 is connected between the low-voltage AC power supply 301 and the first switch set 302, of which the implementation effect and principle are the same as the embodiment shown in FIG. 11, and will not be repeated herein.

In the above embodiments, when the bus voltage in the first power unit group 201 reaches the first voltage threshold, or after a second preset duration, it indicates that pre-charging process of the bus capacitor of each power unit in the first power unit group 201 has been completed. At this time, the control unit controls the rectifier circuit in each power unit of the first power unit group 201 to work, to magnetize the main transformer 100.

For example, the control unit performs a pulse width modulation (PWM) control for the rectifier circuits in the first power unit group 201, to magnetize the main transformer through the secondary windings connected with the first group of power 201.

Where, when the first power unit group 201 includes multiple power units, and the control unit performs the PWM control for the rectifier circuits in the first power unit group 201, the control unit should control preset modulation instructions of the rectifier circuits of multiple power units in the first power unit group 201 to satisfy a preset phase relationship, to avoid mutual demagnetization effects. In other words, if the precharge unit 300 is connected with multiple power units, and when the rectifier circuits in the multiple power units start to work, the control unit controls the corresponding PWM control between the rectifier circuits of the multiple power units to satisfy the preset phase relationship to avoid mutual demagnetization.

In an embodiment, when the PWM control for the rectifier circuits in the first power unit group 201 are performed, the main transformer 100 can be magnetized through the generated PWM voltage of the rectifier circuits according to a preset modulation instruction, so that other secondary windings of the main transformer 100 perform pre-charging for respective and corresponding bus capacitors through corresponding rectifier circuits in the second power unit group. Taking the power unit in FIG. 6 as an example, the main transformer is magnetized through the first power unit group 201 so that other secondary windings generate voltages, and the other secondary windings perform pre-charging for corresponding bus capacitors through anti-parallel diodes in the rectifier circuits in the second power unit group. Where, the other secondary windings refer to the secondary windings which are not connected with the first power unit group 201.

Alternatively, the preset modulation instruction may be AC instruction, the value of which increases gradually. A modulation ratio of the PWM control ramps up to ensure that the magnetization process proceeds slowly. In other words, when the preset modulation instruction is gradually increased, the voltages of the corresponding bus capacitors in the second power unit group gradually increase, where the preset modulation instruction represents the magnitude of the PWM voltage, to control the magnitude of a precharging current.

When the preset modulation instruction reaches a modulation instruction threshold, or the voltages of the bus capacitors in the second power unit group reach a preset value, then the magnetization process is completed, and the pre-charging process for the bus capacitors in the second power unit group is completed. In other words, the pre-charging process for the cascade converter is completed. Where, the modulation instruction threshold can be set according to actual working conditions, which is not limited in the embodiments of the present application.

In an embodiment, when the voltages of the bus capacitors in the second power unit group reach a second voltage threshold, the control unit may perform a closed-loop PWM control for the rectifier circuits in the second power unit group, so that the closed-loop PWM control runs a preset duration until the bus voltages of the second power unit group tend to a preset stable range, at this time, it indicates that the pre-charging process of the cascade converter is completed. Where, the preset duration for running the closed-loop PWM and a preset stable range that the bus voltages tend to may be set according to actual working conditions, which are not limited in the embodiments of the present application. In addition, the second voltage threshold may be equal to or different from the first voltage threshold, and may be set according to actual working conditions, which is not limited in the embodiments of the present application.

Through the description of the above various embodiments, after the pre-charging process of the cascade converter is completed, the control unit may stop the PWM control for the power units in the second power unit group, and turn off the first switch set 302, so that the precharge unit 300 is separated from the cascade converter, and the control unit starts to turn on the high voltage startup set in front of the main transformer 100, and the cascade converter enters normal operation.

The second power unit group in each of the above embodiments performs the pre-charging process of the bus capacitors thereof through the function of magnetization of the main transformer, they are not shown in the above illustration.

Figure 12:
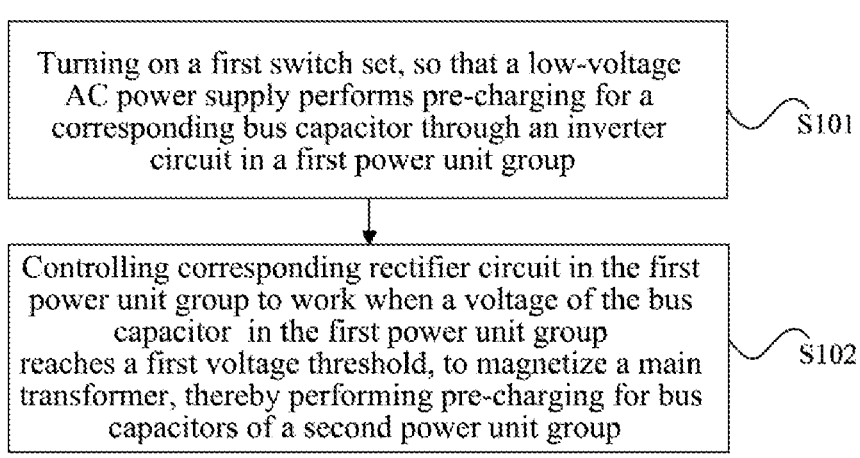
FIG. 12 is a schematic flowchart of a method for pre-charging a cascade converter provided by an embodiment of the present application.

FIG. 12 is a schematic flowchart of a method for pre-charging cascade converter provided by an embodiment of the present application. As shown in FIG. 12, the pre-charging method provided by this embodiment includes:

S101: turning on a first switch set, so that a low-voltage AC power supply performs pre-charging for a corresponding bus capacitor through an inverter circuit in a first power unit group.

S102: controlling corresponding rectifier circuit in the first power unit group to work when a voltage of the bus capacitor in the first power unit group reaches a first voltage threshold, to magnetize a main transformer, thereby performing pre-charging for bus capacitors of a second power unit group.

In some other embodiments, the S102 may be: controlling corresponding rectifier circuit in the first power unit group to work after a second preset duration, to magnetize a main transformer, thereby performing pre-charging for bus capacitors of a second power unit group.

The method for pre-charging the cascade converter provided by the embodiment of the present application is applied to the cascade converter in the above embodiments, where the cascade converter includes the main transformer, multiple power units, and a precharge unit, and the pre-charging method thereof is executed by a control unit.

By turning on the first switch set, the low-voltage AC power supply provides voltage, and perform pre-charging for the corresponding bus capacitor through the inverter circuit in the first power unit group Specifically, through the anti-parallel diodes of the inverter circuit in the first power unit group, the corresponding bus capacitor is pre-charged thereof. After the voltage of the bus capacitor in the first power unit group, reaches the first voltage threshold, the rectifier circuit in the first power unit group is controlled to work, to magnetize the main transformer, so that pre-charging for the bus capacitors of the second power unit group is performed through the main transformer.

Figure 13:
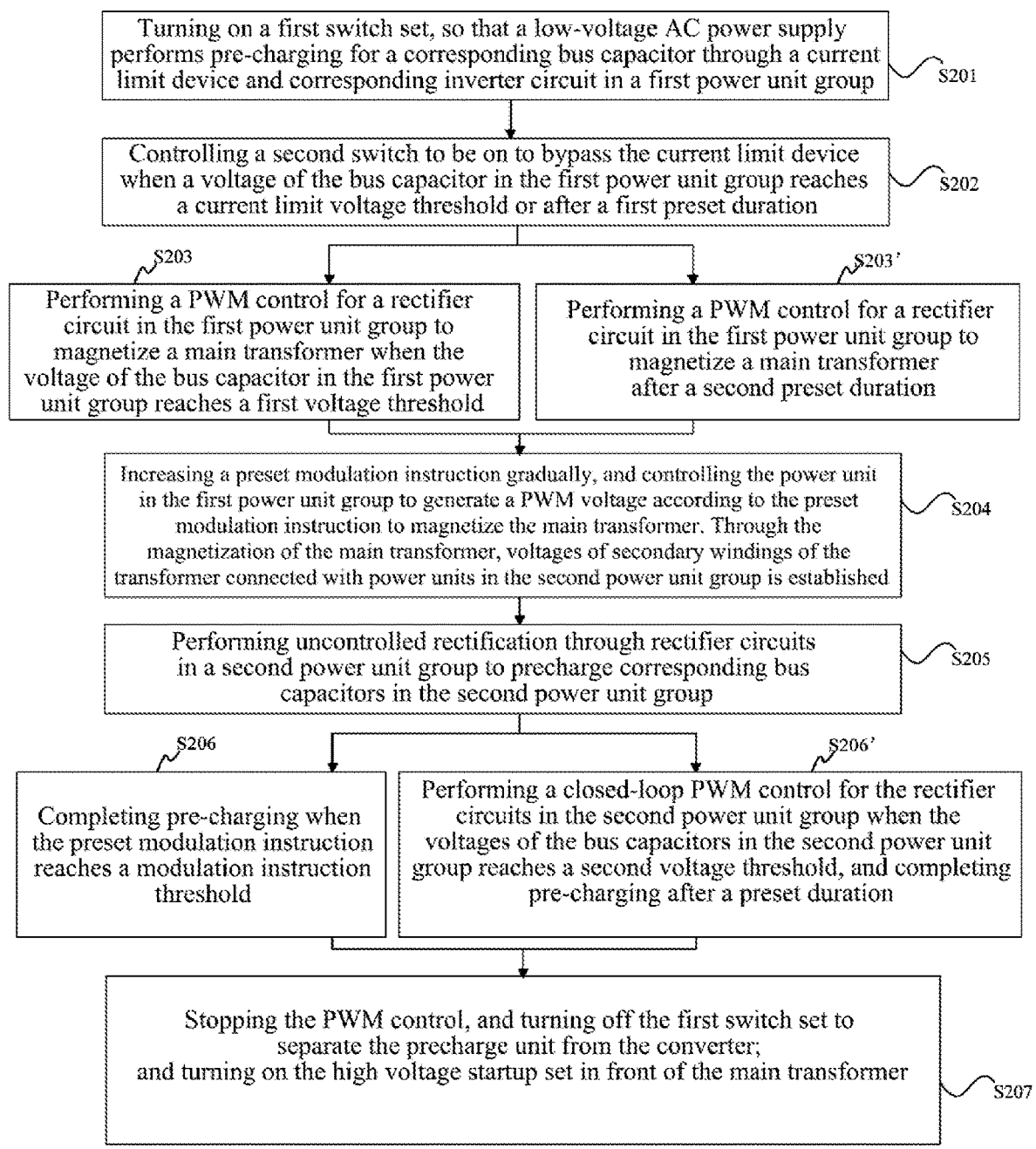
FIG. 13 is a schematic flowchart of another method for pre-charging a cascade converter provided by an embodiment of the present application.

FIG. 13 is a schematic flowchart of another method for pre-charging a cascade inverter provided by an embodiment of the present application. As shown in FIG. 13, the pre-charging method provided by this embodiment includes:

S201: turning on a first switch set, so that a low-voltage AC power supply performs pre-charging for a corresponding bus capacitor through a current limit device and corresponding inverter circuit in a first power unit group.

S202: controlling a second switch to be turned on to bypass the current limit device when a voltage of the bus capacitor in the first power unit group reaches a current limit voltage threshold or after a first preset duration.

S203: performing a PWM control for a rectifier circuit in the first power unit group to magnetize a main transformer when the voltage of the bus capacitor in the first power unit group reaches a first voltage threshold. Or S203': performing a PWM control for a rectifier circuit in the first power unit group to magnetize a main transformer after a second preset duration.

S203 and S203' can be selected according to actual requirements.

S204: increasing a preset modulation instruction gradually, and controlling the power unit in the first power unit group to generate PWM voltage according to the preset modulation instruction to magnetize the main transformer. Through the magnetization of the main transformer, voltages of secondary windings connected with power units in the second power unit group are established.

S205: performing uncontrolled rectification through rectifier circuits in a second power unit group to pre-charge corresponding bus capacitors in the second power unit group.

S206: completing pre-charging when the preset modulation instruction reaches a modulation instruction threshold.

S206': performing a closed-loop PWM control for the rectifier circuits in the second power unit group when the voltage of the bus capacitors in the second power unit group reaches a second voltage threshold; and completing pre-charging after a preset duration.

Where, S206 and S206' can be selected according to the requirements.

S207: stopping the PWM control, and turning off the first switch set to separate the precharge unit from the converter; and turning on the high voltage startup set in front of the main transformer.

Where, the PWM control includes the aforementioned PWM control that performed for the rectifier circuits in the first power unit group, and the closed-loop PWM control that performed for the rectifier circuits in the second power unit group.

In an embodiment, when the rectifier circuits in the multiple power units of the first power unit group start to work, the preset modulation instructions between the rectifier circuits of the corresponding multiple power units should satisfy a preset phase relationship, to avoid mutual demagnetization.

The method for pre-charging the cascade converter provided by this embodiment is applied to cascade converters. The pre-charging method provided by this embodiment does not need to set additional circuits such as pre-charging converters and the like in the original cascade converters, and utilizes its own circuit of the cascade converter to realize controllable soft charging for the capacitor of each unit, effectively avoiding inrush current impact on the power semiconductor devices when the high-voltage side is powered on, which improves the startup reliability to the system and greatly reduces the investment cost of the pre-charge.

Figure 14:
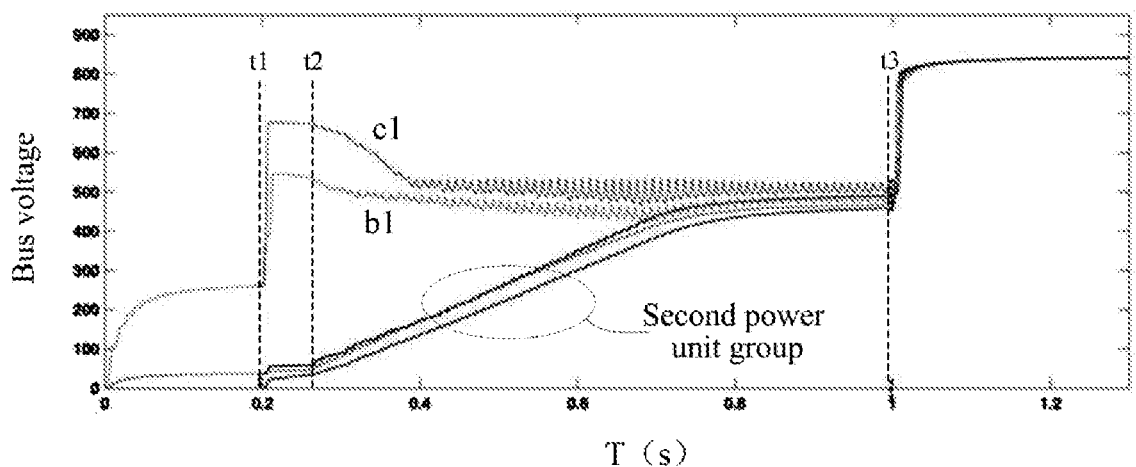
FIG. 14 is a schematic diagram of simulation waveforms of pre-charging process provided by an embodiment of the present application.

FIG. 14 is a schematic diagram of simulation waveforms of pre-charging process provided by an embodiment of the present application. As shown in FIG. 14, a low-voltage AC power supply performs pre-charging for a corresponding bus capacitor through a rectifier circuit in a first power unit group during a period 0-t1. For example, the first power unit group in FIG. 14 include two power units c1, b1. After a first preset duration, for example, at time t1, or when the voltage of the bus capacitor in the first power unit group reaches the current limit voltage threshold, the current limit device is bypassed. At this time, the bus voltages of the two power units c1 and b1 further increase. Then after a second preset duration, for example, at time t2, a PWM control is started for the rectifier circuit in the first power unit group, and a PWM voltage is generated according to a preset modulation instruction so that the main transformer is slowly magnetized, and through uncontrolled rectification of the rectifier circuits in a second power unit group, the corresponding bus capacitors in the second group is pre-charged slowly. At time t3, the preset modulation instruction may reach a modulation instruction threshold, and the pre-charging process is completed. After time t3, the PWM control of each unit is stopped, and the first switch set is turned off, so that the precharge unit is separated from the cascade converter, and the high voltage startup set in front of the main transformer is turned on, and the cascade converter starts to operate normally.

Figure 15:
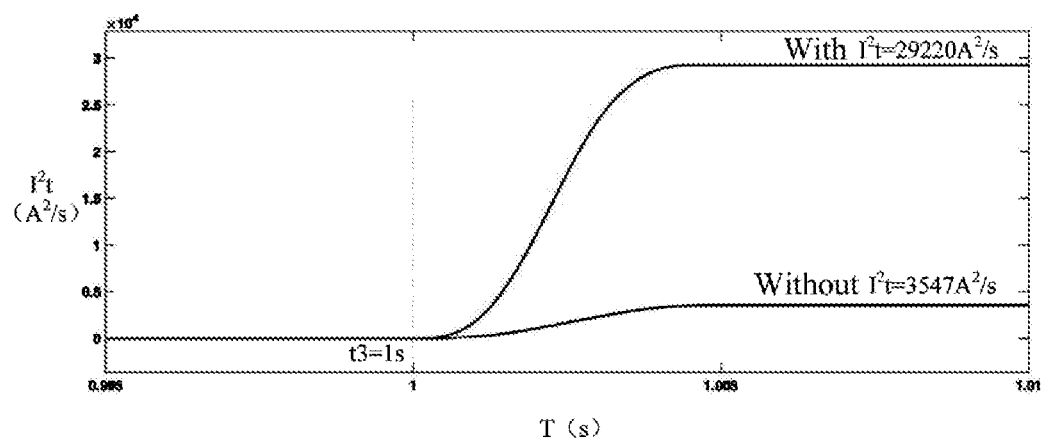
FIG. 15 is a schematic diagram of comparison of inrush current provided by an embodiment of the present application.

FIG. 15 is a schematic diagram of comparison of inrush current provided by an embodiment of the present application, and t3 has the same meaning as in FIG. 14. FIG. 15 shows a diagram of comparison of the inrush current detected by the same power unit with and without the pre-charging provided by the embodiments of the present application. As shown in FIG. 15, after performing pre-charging for the bus capacitors in the cascade converter through the pre-charging method provided by the embodiments of the present application, when the high-voltage side of the main transformer is powered on, at time t3, the value of the inrush current suffered by the power unit is 3547A2/s. Without performing pre-charging, the value of the inrush current thereof can reach to 29220 A2/s. So the method for pre-charging the cascade converter provided by the embodiments of the present application can effectively avoid the excessive impact when the high-voltage is powered on, which effectively improves the startup reliability of the system.

Figure 16:
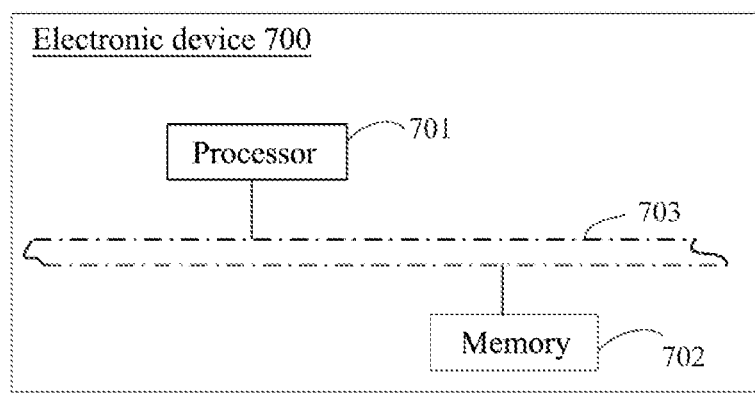
FIG. 16 is a schematic structural diagram of an electronic device provided by an embodiment of the present application.

FIG. 16 is a schematic structural diagram of an electronic device provided by an embodiment of the present application. As shown in FIG. 16, the electronic device 700 provided by this embodiment includes:

a processor 701; and a memory 702, communicatively connected with the processor 701.

Where, the memory 702 stores instructions that can be executed by the processor 701, and the instructions are executed by the processor 701, so that the processor 701 can execute each step of the method for pre-charging the cascade converter in the above method embodiments, for details, refers to relevant descriptions in the foregoing method embodiments.

In an embodiment, the memory 702 may be independent or integrated with the processor 701.

When the memory 702 is a device independent of the processor 701, the electronic device 700 may further include:

a bus 703, configured to connect the processor 701 and the memory 702.

In addition, a non-transitory computer-readable storage medium storing computer instructions is also provided in an embodiment of the present application, and the computer instructions are used to cause a computer to execute each step of the method for pre-charging the cascade converter in the foregoing embodiments. For example, the readable storage medium may be a Read Only Memory (ROM), a random access memory (RAM), a Compact Disc ROM (CD-ROM), a magnetic tape, a floppy disk, an optical data storage device, and the like.

After considering the description and practicing the disclosure disclosed herein, those skilled in the art will easily think of other implementations of the present application. The present application is intended to cover any variations, uses, or adaptive changes of the present application, these variations, uses, or adaptive changes follow the general principles of the present application and include common knowledge or conventional technical means in the art not disclosed in the present application. The description and embodiments are only to be regarded as exemplary, and the true scope and spirit of the present application are indicated by the claims.

It should be understood that the present application is not limited to the precise structure that has been described above and shown in the drawings, and various modifications and changes can be made without departing from the scope thereof. The scope of the present application is limited only by the appended claims.

What is claimed is:

1. A cascade converter, comprising:
   a main transformer, comprising a primary winding and multiple secondary windings;
   multiple power units, connected with the multiple secondary windings in a one-to-one correspondence; wherein each of the power units comprises a rectifier circuit, a bus capacitor, and an inverter circuit, and the bus capacitor is connected between the rectifier circuit and the inverter circuit;
   a precharge unit, connected with at least one power unit; wherein the precharge unit comprises a low-voltage AC power supply and a first switch set, and the low-voltage AC power supply is configured to provide power to pre-charge the converter; wherein the at least one power unit connected with the precharge unit is a first power unit group, and power units not connected with the precharge unit are a second power unit group; and
   a control unit, configured to control the first switch set to be turned on, so that the low-voltage AC power supply performs pre-charging for a corresponding bus capacitor through the inverter circuit in the first power unit group, and control the rectifier circuit in the first power unit group to work to magnetize the main transformer when a voltage of the bus capacitor in the first power unit group reaches a first voltage threshold, thereby performing pre-charging for bus capacitors in the second power unit group.

2. The cascade converter according to claim 1, wherein the first power unit group is located at a location nearby a neutral point.

3. The cascade converter according to claim 1, wherein the precharge unit further comprises: a current limit start circuit set, connected between the low-voltage AC power supply and the first switch set, wherein the current limit start circuit set comprises at least one second switch and at least one current limit device that are connected in parallel.

4. The cascade converter according to claim 3, wherein the precharge unit further comprises: an auxiliary transformer, connected between the current limit start circuit set and the first switch set; and the auxiliary transformer is configured to transform a voltage of the low-voltage AC power supply.

5. The cascade converter according to claim 3, wherein when the low-voltage AC power supply starts to perform pre-charging for the corresponding bus capacitor through the inverter circuit in the first power unit group, the at least one second switch is in an off state; and when the voltage of the bus capacitor in the first power unit group reaches a current limit voltage threshold or after a first preset duration, the control unit controls the at least one second switch to be turned on to bypass the at least one current limit device.

6. The cascade converter according to claim 5, wherein when the voltage of the bus capacitor in the first power unit group reaches the first voltage threshold or after a second preset duration, the control unit performs Pulse Width Modulation (PWM) control for the rectifier circuit in the first power unit group, thereby magnetizing the main transformer through secondary windings connected with the first power unit group.

7. The cascade converter according to claim 6, wherein the control unit controls the first power unit group to generate a PWM voltage according to a preset modulation instruction to magnetize the main transformer, and other secondary windings of the main transformer perform pre-charging for corresponding bus capacitors through rectifier circuits in the second power unit group.

8. The cascade converter according to claim 7, wherein the preset modulation instruction is gradually increased, and voltages of the bus capacitors in the second power unit group gradually increase; when the preset modulation instruction reaches a modulation instruction threshold, pre-charging is completed; wherein the preset modulation instruction is used to characterize a magnitude of the PWM voltage; wherein after pre-charging is completed, the control unit finishes the PWM control and turns off the first switch set to separate the precharge unit from the converter, and starts to turn on a high voltage startup set in front of the main transformer.

9. The cascade converter according to claim 7, wherein when voltages of the bus capacitors in the second power unit group reach a second voltage threshold, the control unit performs a closed-loop PWM control for the rectifier circuits in the second power unit group;
   wherein after pre-charging is completed, the control unit finishes the PWM control and turns off the first switch set to separate the precharge unit from the converter, and starts to turn on a high voltage startup set in front of the main transformer.

10. The cascade converter according to claim 7, wherein when the precharge unit is connected with multiple power units, and when rectifier circuits of the multiple power units in the first power unit group start to work, the control unit controls the preset modulation instructions between the rectifier circuits in the first power unit group to satisfy a preset phase relationship to avoid mutual demagnetization.

11. A method for pre-charging a cascade converter, wherein the converter comprises a main transformer, multiple power units and a precharge unit; each of the power units comprises a rectifier circuit, a bus capacitor and an inverter circuit, and the bus capacitor is connected between the rectifier circuit and the inverter circuit; the precharge unit is connected with at least one power unit, and the precharge unit comprises a low-voltage AC power supply and a first switch set; wherein the at least one power unit connected with the precharge unit is a first power unit group, and power units not connected with the precharge unit are a second power unit group; the method comprising:
   turning on the first switch set, so that the low-voltage AC power supply performs pre-charging for a corresponding bus capacitor through the inverter circuit in the first power unit group; and
   controlling the rectifier circuit in the first power unit group to work to magnetize the main transformer when a voltage of the bus capacitor in the first power unit group reaches a first voltage threshold, thereby performing pre-charging for bus capacitors in the second power unit group.

12. The method for pre-charging cascade converter according to claim 11, wherein pre-charging for the corresponding bus capacitor is performed through the inverter circuit in the first power unit group.

13. The method for pre-charging cascade converter according to claim 12, wherein the precharge unit further comprises: a current limit start circuit set, connected between the low-voltage AC power supply and the first switch set, and the current limit start circuit set comprises at least one second switch and at least one current limit device that are connected in parallel;
   wherein the at least one second switch is in an off state and the bus capacitor in the first power unit group is pre-charged through the at least one current limit device when the low-voltage AC power supply starts to perform pre-charging for the corresponding bus capacitor; and the method further comprises:

turning on the at least one second switch to bypass the at least one current limit device when the voltage of the bus capacitor in the first power unit group reaches a current limit voltage threshold or after a first preset duration.

14. The method for pre-charging cascade converter according to claim 13, wherein the precharge unit further comprises: an auxiliary transformer, connected between the current limit start circuit set and the first switch set; and the auxiliary transformer is configured to transform a voltage of the low-voltage AC power supply.

15. The method for pre-charging cascade converter according to claim 12, wherein when the voltage of the bus capacitor in the first power unit group reaches the first voltage threshold or after a second preset duration, a Pulse Width Modulation (PWM) control is carried out for the rectifier circuit in the first power unit group to magnetize the main transformer through secondary windings connected with the first power unit group.

16. The method for pre-charging cascade converter according to claim 15, wherein the first power unit group is controlled to generate a PWM voltage according to a preset modulation instruction to magnetize the main transformer, and bus capacitors in the second power unit group are pre-charged by corresponding secondary windings of the main transformer and rectifier circuits in the second power unit group.

17. The method for pre-charging a cascade inverter according to claim 16, wherein the preset modulation instruction is gradually increased, and voltages of the bus capacitors in the second power unit group gradually increase; when the preset modulation instruction reaches a modulation instruction threshold, pre-charging is completed; wherein the preset modulation instruction is used to characterize a magnitude of the PWM voltage;

after pre-charging is completed, the PWM control is finished and the first switch set is turned off to separate the precharge unit from the converter, and a high voltage startup set in front of the main transformer is turned on.

18. The method for pre-charging a cascade inverter according to claim 17, wherein when the voltages of the bus capacitors in the second power unit group reach a second voltage threshold, a closed-loop PWM control is carried out for the rectifier circuits in the second power unit group to complete pre-charging;

after pre-charging is completed, the PWM control is finished and the first switch set is turned off to separate the precharge unit from the converter, and a high voltage startup set in front of the main transformer is turned on.

19. The method for pre-charging a cascade converter according to claim 16, wherein when the precharge unit is connected with multiple power units;

when rectifier circuits of the multiple power units in the first power unit group start to work, preset modulation instructions between the rectifier circuits in the first power unit group satisfy a preset phase relationship to avoid mutual demagnetization.

20. The method for pre-charging cascade converter according to claim 11, wherein the first power unit group is located at a location nearby a neutral point.

* * * * *